(12) United States Patent
Barry

(10) Patent No.: US 9,189,640 B2
(45) Date of Patent: Nov. 17, 2015

(54) METHODS AND APPARATUS FOR RE-PROVISIONING A SERVER OF A DATA CENTER

(75) Inventor: Timothy G. Barry, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 3211 days.

(21) Appl. No.: 11/264,618

(22) Filed: Oct. 31, 2005

(65) Prior Publication Data

US 2007/0100977 A1    May 3, 2007

(51) Int. Cl.
*G06F 21/62* (2013.01)
*G06F 11/14* (2006.01)

(52) U.S. Cl.
CPC ............ *G06F 21/62* (2013.01); *G06F 11/1435* (2013.01); *G06F 11/1417* (2013.01); *G06F 2221/2143* (2013.01)

(58) Field of Classification Search
CPC .. G06F 11/1435; G06F 11/1417; G06F 21/62
USPC ........................................................ 709/219
See application file for complete search history.

(56) References Cited

U.S. PATENT DOCUMENTS

| 7,275,139 | B1* | 9/2007 | Tormasov et al. | 711/159 |
|---|---|---|---|---|
| 7,469,279 | B1* | 12/2008 | Stamler et al. | 709/221 |
| 2002/0184484 | A1* | 12/2002 | Abboud et al. | 713/100 |
| 2003/0041239 | A1* | 2/2003 | Shear et al. | 713/156 |
| 2004/0111636 | A1* | 6/2004 | Baffes et al. | 713/201 |
| 2004/0177295 | A1* | 9/2004 | Barone | 714/724 |
| 2004/0202253 | A1* | 10/2004 | Hanibuchi | 375/257 |
| 2004/0230797 | A1* | 11/2004 | Ofek et al. | 713/168 |
| 2005/0091215 | A1* | 4/2005 | Chandra et al. | 707/10 |
| 2005/0198530 | A1* | 9/2005 | Chess et al. | 713/201 |
| 2006/0098645 | A1* | 5/2006 | Walkin | 370/389 |
| 2006/0212549 | A1* | 9/2006 | Hokkyo et al. | 709/220 |

* cited by examiner

*Primary Examiner* — Suraj Joshi
(74) *Attorney, Agent, or Firm* — Hewlett-Packard Patent Department

(57) ABSTRACT

In a computer-implemented method for re-provisioning a server of a data center, and while the server is provisioned to a first virtual network of the data center, the server is provided 1) a pseudo-random data stream, and 2) instructions on how to overwrite substantially all of its data storage volumes using the pseudo-random data stream. Upon completion of the overwrite, the server is powered down, then moved to a second virtual network of the data center, and then caused to initiate a network boot from within the second virtual network. After the network boot of the server, one or more indications of the data stored at a number of addresses of the server's data storage volumes are requested from the server via the second virtual network. It is then determined whether the server is in a compromised state by, remotely from the server, comparing the provided indication(s) to one or more expected indications.

19 Claims, 3 Drawing Sheets

METHODS AND APPARATUS FOR RE-PROVISIONING A SERVER OF A DATA CENTER

BACKGROUND

A data center is a collection of secure, fault-resistant resources that are accessed by users over a communications network (e.g., a wide area network (WAN) such as the Internet). By way of example only, the resources of a data center may comprise servers, storage, switches, routers, or modems. Often, data centers provide support for corporate websites and services, web hosting companies, telephony service providers, internet service providers, or application service providers.

Some data centers, such as Hewlett-Packard Company's Utility Data Center (UDC), provide for virtualization of various resources within the data center. For example, a data center may comprise a server pool from which servers may be dynamically provisioned to form one or more virtual networks. The virtual networks may then be provisioned to one or more clients.

One issue that needs to be addressed by a data center is security, including 1) the security of the data center's core (e.g., the data center's controller) from attack via one or more of the virtual networks, and 2) the security of each virtual network from attack via another one of the virtual networks.

SUMMARY OF THE INVENTION

In one embodiment, a computer-implemented method for re-provisioning a server of a data center comprises, while the server is provisioned to a first virtual network of the data center, providing the server 1) a pseudo-random data stream, and 2) instructions on how to overwrite substantially all of its data storage volumes using the pseudo-random data stream. Upon completion of the overwrite, the server is powered down, then moved to a second virtual network of the data center, and then caused to initiate a network boot from within the second virtual network. After the network boot of the server, one or more indications of the data stored at a number of addresses of the server's data storage volumes are requested from the server via the second virtual network. It is then determined whether the server is in a compromised state by, remotely from the server, comparing the provided indication(s) to one or more expected indications.

Other embodiments are also disclosed.

BRIEF DESCRIPTION OF THE DRAWINGS

Illustrative and presently preferred embodiments of the invention are illustrated in the drawings, in which.

DETAILED DESCRIPTION OF AN EMBODIMENT

Figure 1:
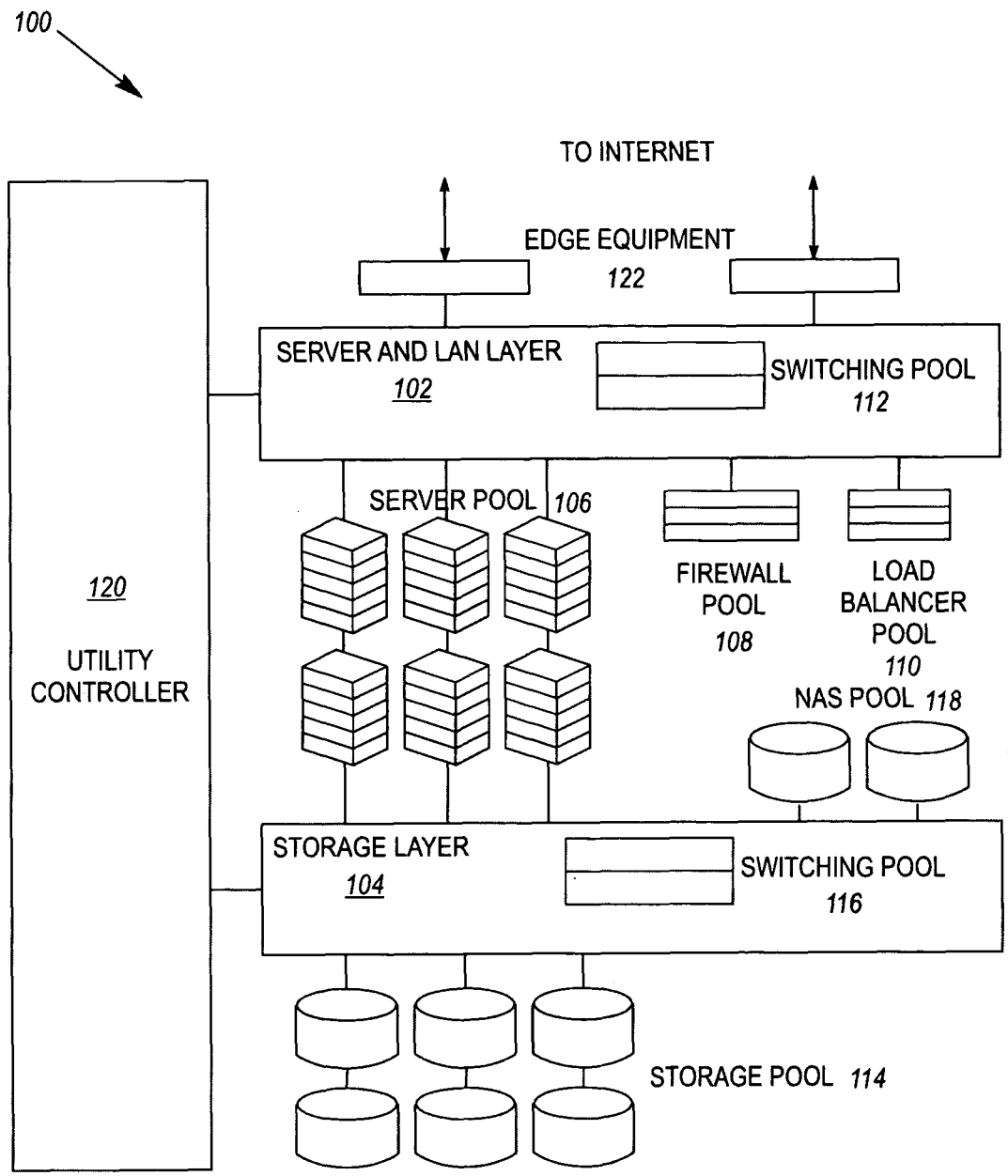
FIG. 1 illustrates an exemplary embodiment of a data center.

Portions of an exemplary data center 100 are shown in FIG. 1. The data center 100 generally comprises a virtual server and local area network (LAN) layer 102 and a virtual storage layer 104. The server and LAN layer 102 may comprise various resources, including a server pool 106, a firewall pool 108, a load balancer pool 110, a switching pool 112 and other resources (e.g., routers). The storage layer 104 may also comprise various resources, including a storage pool 114, a switching pool 116 and other resources (e.g., specific types of storage pools, such as a network area storage (NAS) pool 118 or a storage area network (SAN)).

Figure 2:
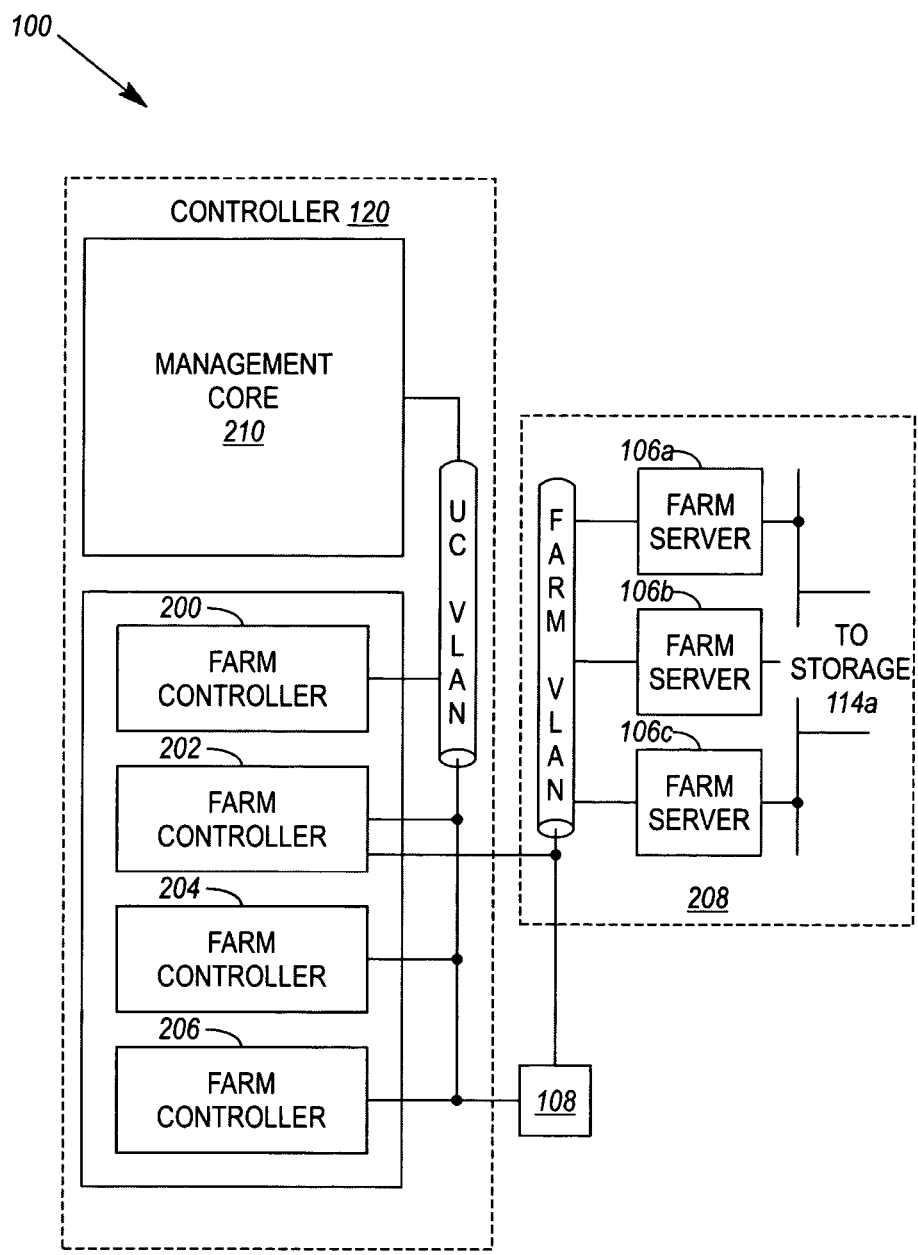
FIG. 2 provides an exemplary virtual configuration of various resources provided by the FIG. 1 data center.

The data center 100 further comprises a controller 120. As shown in FIG. 2, the controller 120 may comprise a collection of resources that, together, provide the functionality of the controller 120.

Various types of edge equipment 122 (e.g., routers, switches and load balancers) may connect the resources of the data center 100 to a wide area network (WAN) such as the. Internet.

As used herein, "virtual resources" are resources that are physically connected in one way, but capable of logical presentation in different ways. In this manner, the resources may be logically presented to users of different security and trust domains, without having to physically move or rewire the resources. It should be noted, however, that the novel re-provisioning methods and apparatus disclosed herein are not limited to use by the exemplary data center 100.

FIG. 2 provides an exemplary virtual configuration of various resources provided by the FIG. 1 data center 100. As shown in FIG. 2, the controller 120 may comprise a plurality of farm controllers 200, 202, 204, 206. Machine executable instructions (i.e., program code) executed by the controller 120 may establish a number (i.e., one or more) of secure, virtual farm networks 208 by associating at least one of the farm controllers 202 with 1) a number of farm servers 106a, 106b, 106c in the server pool 106, and 2) at least one storage resource 114a in the storage pool 114. Upon selection of a farm controller 202 to control a particular virtual farm network 208, the controller 120 (and, more preferably, the farm controller 202) may dynamically create a virtual farm interface for communicating with the virtual farm network 208. In a preferred embodiment, a single farm controller 202 manages each farm network 208. In FIG. 2, only a single virtual farm network 208 (FARM VLAN) is shown.

The host controllers 200-206 may be associated with a number of different domains. For example, a controller domain (possibly comprising various subnets) may associate interfaces of the farm controllers with other controller resources, including other servers and software applications, and possibly a controller management core 210. In FIG. 2, components 200-206, 210 of the controller domain are coupled to one another via the UC VLAN. The UC VLAN may be coupled to the data center's various farm networks 208 (e.g., FARM VLAN, a farm domain) via a number of firewalls 108. In this manner, operations of the controller 120 may be secured from attack by means of the data center's farm networks 208.

Figure 3:
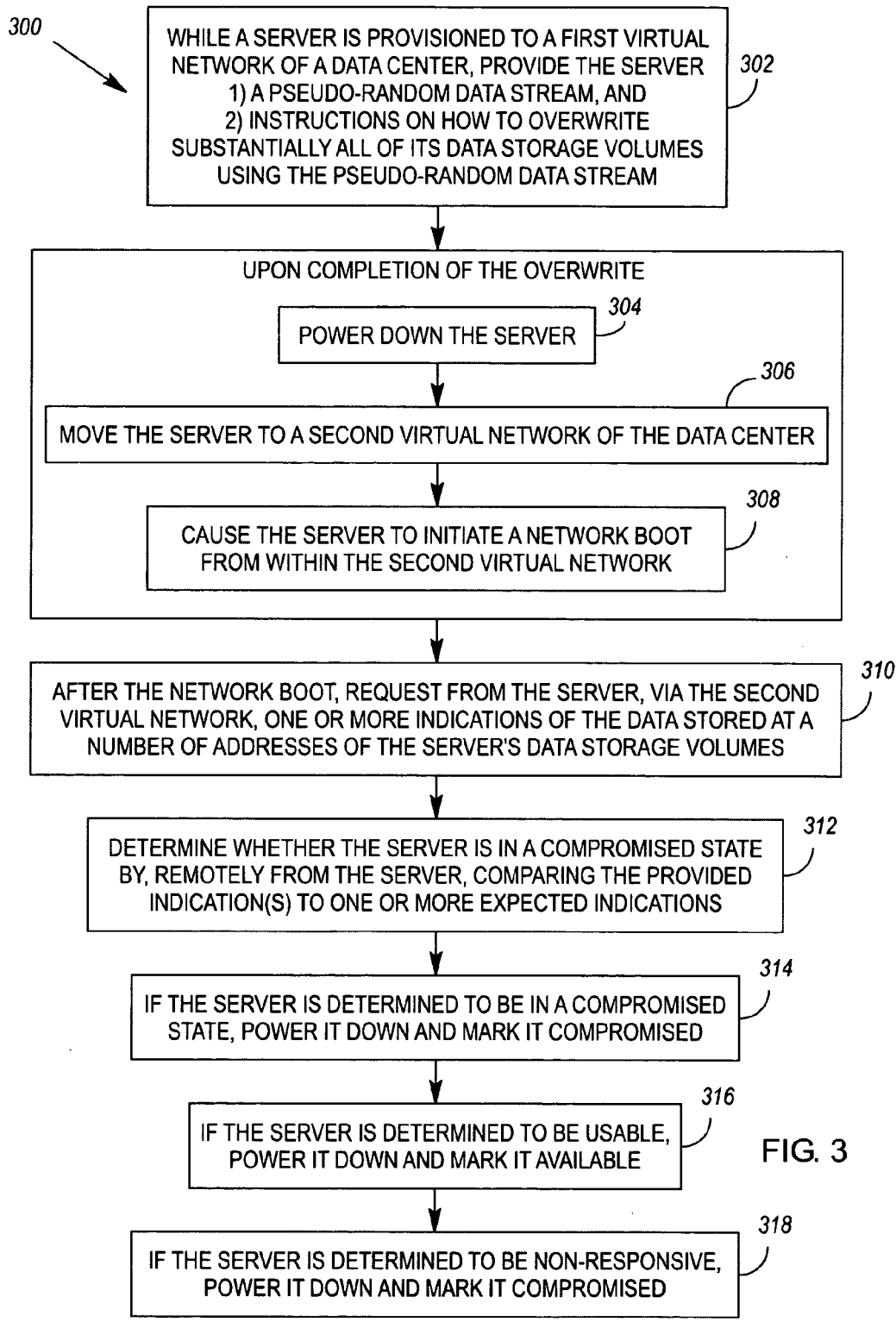
FIG. 3 illustrates an exemplary method for re-provisioning a server of a data center such as that which is shown in FIGS. 1 & 2).

One way in which the controller 120 and farm domains 208 of the data center 100 are subject to attack is when a server (e.g., server 106a) is re-provisioned (e.g., when a server 106a is re-provisioned from one farm network 208 to another, or when a server 106a is decommissioned from a farm network 208 and freed for future use). In each of these situations, the movement of a server 106a between virtual networks presents an opportunity for viruses and other malicious processes to infect, degrade or otherwise interfere with other virtual networks or resources of the data center 100. Movement of a server 106a from a farm network 208 also presents a risk of inadvertently exposing licensed software, client data and other sensitive information to clients of the data center 100 that should not be provided access to the applications and data. FIG. 3 therefore illustrates a novel computer-implemented method 300 for re-provisioning a server 106a of a data center 100.

The method 300 commences while a server 106a at issue is provisioned to a first virtual network (e.g., a farm network 208) of the data center 100. In some cases, the method 300 may be initiated by the controller 120. In other cases, the method 300 may be initiated upon the request of a client to which the first virtual network 208 has been provisioned, such as when a client wants to release some of the servers of their farm network to save cost. In either case, however, the method 300 is executed under control of a process or processes (e.g., the controller 120) that are 1) remote from the server 106a, and 2) trusted.

The method 300 proceeds as follows. While the server 106a is provisioned to the first virtual network 208, the server 106a is provided 302 by, for example, the controller 120, 1) a pseudo-random data stream, and 2) instructions on how to overwrite substantially all of its data storage volumes using the pseudo-random data stream. A server's data storage volumes may comprise all of its direct attached storage (DAS), including SCSI, IDE, EIDE and other non-volatile storage volumes. These volumes may contain operating systems, client data, malicious or sleeper codes, viruses and other residual data.

Upon completion of the server's overwrite of its data storage volumes, the server 106a is powered down 304, moved 306 to a second virtual network of the data center 100, and then caused 308 to initiate a network boot from within the second virtual network. After the network boot, one or more indications of the data stored at a number of addresses of the server's data storage volumes are requested 310 from the server 106a via the second virtual network (e.g., by the controller 120, or by some trusted process that is remote from the server 106a). It is then determined whether the server 106a is in a compromised state by, remotely from the server (e.g., by means of the controller 120), comparing 312 the provided indication(s) to one or more expected indications.

If the controller 120 or trusted remote process determines 314 that the server 106a is in a compromised state, the server 106a may be powered down and marked as compromised. As with other steps of the method 300, the powering down of the server 106a is controlled by the controller 120 or other trusted remote process.

If the server 106a is determined 316 to be usable (i.e. in a non-compromised state), then it may be powered down and marked as being available for further re-provisioning. Re-provisioning may occur immediately, or at some future point in time.

In some cases, the server 106a may be determined 318 to be non-responsive. The server 106a may be non-responsive due to a system failure or "glitch", or because the server 106a in a compromised state. In either case, the server 106a is treated as if it is in a compromised state and is powered down and marked as compromised.

In one embodiment of the method 300, the instructions on how to overwrite substantially all of the server's data storage volumes are provided to the server 106a, at least in part, by causing the server 106a to load a volume overwrite agent. By way of example, the controller 120 may instruct the server 106a to download the agent, or the controller 120 may "push" the agent to the server 106a.

The agent may be provided to the server 106a as a binary executable and/or script that is self-contained upon loading. In this manner, the agent may be run from memory (of the server 106a) without requiring storage space in the data storage volumes that are to be scrubbed. Also, any network code or handshaking mechanisms should be run from the server's memory (i.e., run self-contained and be memory-resident). Although the agent could potentially be installed on a server's data storage volumes, this is less desirable, as it prevents the scrubbing of a portion of the data storage volumes, and thereby poses a risk for re-infection of the data storage volumes after they are scrubbed.

After causing the server 106a to load the agent, but before providing the pseudo-random data stream to the server, the controller 120 may verify the loading of the agent. This may be done, for example, using a local certificate authority of the server 106a. If loading of the volume overwrite agent cannot be verified, the server 106a may be powered down and then 1) removed from the first virtual network 208, and 2) marked as compromised.

In addition to (or instead of) the instructions contained within the volume overwrite agent, other instructions may be provided to the server 106a. For example, instructions on how to overwrite a server's data storage volumes may be provided with, or implied by, the pseudo-random data stream.

By "pseudo-random", it is meant that the data stream provided to the server 106a appears random to the server 106a, but is constructed via a known formula or seed held by the controller 120. The pseudo-random data stream may take various forms, but is preferably cryptographically seeded, skew-corrected (i.e., having balanced and non-repeating patterns of 1's and 0's) and non-compressible. The cryptographic seed may be provided to, or determined by, the controller 120. However, the seed should not be known by, or provided to, the server 106a.

In addition to being pseudo-random, cryptographically seeded, skew-corrected and non-compressible, the data stream provided to the server 106a should be of a length that is sufficient to fill all of the server's data storage volumes. Preferably, the length of the pseudo-random data stream is determined based on knowledge about the server 106a that is acquired prior to when the server 106a was provisioned to the first virtual network 208.

To ensure that the pseudo-random data stream overwrites all of the server's data storage volumes, the overwrite agent provided to the server 106a should configure all of the server's drive interfaces, as well as the server's network boot kernel, to read and write the server's data storage volumes in raw, direct I/O mode. This prevents the server 106a from maintaining any inaccessible "phantom" storage that is not directly addressed and overwritten by the data stream. Examples of phantom (or meta) storage include things like disk partition tables, master boot records, volume headers, and RAID volume meta-data. All of these need to be overwritten, because they are the most likely places for a security-compromised system to store illicit code or viruses. With respect to RAID volumes, all RAID volume organizations should be dissolved, and disk controller I/O caching should be disabled. This forces all write I/Os to go directly to the media without holding the data temporarily before the writes are committed. Any failed I/Os to storage need to be reported by the overwrite agent as signs of a compromised server 106a.

The indication(s) of the data stored at a number of addresses of a server's data storage volumes may take various forms. For example, they could be the raw contents that are retrieved from the data storage volumes, or they could be one or more checksums of the retrieved data. Checksums are desirable in that they are relatively small, thereby enabling them to be sent to the controller 120 without overburdening the data center's networks. Preferably, any indication (e.g., raw data or checksum) that is provided to the controller 120 is provided in a cryptographically strong manner, thereby making it difficult for the data or checksum to be reverse engineered (that is, if the server is compromised). This also makes it difficult for any malicious code that might intercept the data or checksum during its transmission over the data center's networks to analyze the data or checksum.

During network boot of the server 106a from within the second virtual network, the server 106a may be prepped to obtain the above-referenced indications of the data stored at a number of addresses of its data storage volumes. In one embodiment, this is done by providing the server 106a 1) a random-access memory (RAM) network kernel, 2) an executable that instructs the server 106a to read and form a checksum of the data stored at the number of addresses of the server's data storage volumes, and 3) a script to launch the executable.

The number of addresses from which data is to be read is provided to the server 106a via the controller 120, when the executable requests them. The addresses are not provided to the server 106a until after the server 106a is considered scrubbed, has been placed on the second virtual network, and has been network booted on the second virtual network (which is known to be uncompromised and under control of the controller 120). The addresses may be dynamically generated by the controller 120, and may be randomized by, for example, basing them on a cryptographic seed. In this manner, the server 106a cannot anticipate what the addresses will be, and malicious code cannot ascertain what portions of the pseudo-random data stream it might not need to store.

In a "safest" mode, all of the data that is written to a server's data storage volumes may be read and reported to the controller 120 (e.g., in the form of a checksum). However, this "safest" mode may consume significant time and resources. It is therefore envisioned that data may only be read from tens of thousands of addresses, to provide a good cross-section of the data stored on a server's data storage volumes. In some cases, the same address may be read more than once, to ascertain whether malicious code might be dynamically filling certain addresses with the data that is expected from them.

The method 300 may be variously embodied, but is preferably embodied in sequences of instructions (e.g., program code) that are stored on a number of machine-readable media. By way of example, the instructions may take the form of software or firmware contained within a single disk or memory, or the instructions may take the form of code that is distributed amongst (and executed by) various hardware devices (e.g., the various resources of a data center 100).

The means for executing the method 300 may be the controller 120 of the data center 100, including any number (i.e., one or more) of the processors that are installed in its servers.

Depending on its configuration and application, the method 300 may be used to "scrub" a server 106a of unknown state, and to prevent attacks on other resources within the data center 100, as follows.

Suppose that the volume overwrite agent is replaced by a spoof agent that attempts to compress the pseudo-random data stream with which the server 106a is supposed to overwrite its data storage volumes. This sort of threat is addressed by providing a non-compressible data stream that is of sufficient length to require all of the server's usable storage space. This threat may also be addressed by imposing a time constraint on how quickly the server 106a provides the controller 120 with the indication(s) of what data is stored on its data storage volumes. Thus, even if the spoof agent finds a way to compress the pseudo-random data stream, it is unlikely that the spoof agent will be able to decompress and report the necessary data in a timely fashion. As a result of limited storage space, the decompression may also force the spoof agent to overwrite other data that will need to be recalled. This is especially likely given that any sort of compression technique is also going to have to remember the correspondence between received data and the addresses where it was supposed to have been stored.

Suppose that the server 106a does not complete its network boot (e.g., due to corruption, a corrupted BIOS, a network attack, or a spoofed IP address). If it does not complete a network boot, it may be powered down and marked as compromised. However, suppose that it spoofs its network boot. In this case, the server 106a will still have to provide one or more indications of the data stored in its data storage volumes. If it cannot, and cannot do so timely, it may be powered down and marked as compromised.

What is claimed is:

1. A computer-implemented method for re-provisioning a server of a data center, comprising:
   while the server is provisioned to a first virtual network of the data center, providing the server i) a pseudo-random data stream, and ii) instructions on how to overwrite substantially all of its data storage volumes using the pseudo-random data stream, wherein the pseudo-random data stream appears random to the server and is cryptographically-seeded using a seed that is not known by the server;
   upon completion of the overwrite, powering down the server, then moving the server to a second virtual network of the data center, and then causing the server to initiate a network boot from within the second virtual network; and
   after the network boot of the server, requesting from the server, via the second virtual network, one or more indications of the data stored at a number of addresses of its data storage volumes; and
   determining whether the server is in a compromised state by, remotely from the server, comparing the provided indication(s) to one or more expected indications.

2. The method of claim 1, wherein the instructions on how to overwrite substantially all of the server's data storage volumes are provided, at least in part, by causing the server to load a volume overwrite agent.

3. The method of claim 2, further comprising, after causing the server to load the volume overwrite agent, but before providing the pseudo-random data stream to the server, verifying loading of the volume overwrite agent.

4. The method of claim 3, wherein loading of the volume overwrite agent is verified using a local certificate authority of the server.

5. The method of claim 2, further comprising, if loading of the volume overwrite agent cannot be verified, powering down the server, and then i) removing the server from the first virtual network, and ii) marking the server as compromised.

6. The method of claim 1, wherein the length of the pseudo-random data stream is determined based on knowledge about the server that is acquired prior to when the server was provisioned to the first virtual network.

7. The method of claim 1, wherein the pseudo-random data stream is skew-corrected and non-compressible.

8. The method of claim 1, wherein, during the network boot of the server, the server is provided:
   a random-access memory (RAM) network kernel;
   an executable that instructs the server to read and form a checksum of the data stored at the number of addresses of the server's data storage volumes, wherein the checksum is the requested indication of the data stored at the number of addresses; and
   a script to launch the executable.

9. The method of claim 8, wherein, after the network boot of the server, and from a source remote from the server, the executable is provided the number of addresses of the server's data storage volumes.

10. The method of claim 8, wherein, during the network boot of the server, and from a source remote from the server, the server is further provided the number of addresses of the server's data storage volumes.

11. The method of claim 1, further comprising:
if the server is determined to be in a compromised state, powering down the server and marking the server as compromised; and
if the server is determined to be in a non-compromised state, powering down the server and marking it as being available for further re-provisioning.

12. The method of claim 11, further comprising:
if the server is determined to be in a non-responsive state, powering down the server and marking the server as compromised.

13. A number of non-transitory machine-readable media having stored thereon sequences of instructions that, when executed by a controller of a data center, cause the data center to perform the actions of:
while a server is provisioned to a first virtual network of the data center, providing the server i) a pseudo-random data stream, and ii) instructions on how to overwrite substantially all of its data storage volumes using the pseudo-random data stream, wherein the pseudo-random data stream appears random to the server and is cryptographically-seeded using a seed that is not known by the server;
upon completion of the overwrite, powering down the server, then moving the server to a second virtual network of the data center, and then causing the server to initiate a network boot from within the second virtual network; and
after the network boot of the server, requesting from the server one or more indications of the data stored at a number of addresses of its data storage volumes; and
determining whether the server is in a compromised state by comparing the provided indication(s) to one or more expected indications.

14. The media of claim 13, wherein execution of the sequences of instructions causes the instructions on how to overwrite substantially all of the server's data storage volumes to be provided, at least in part, by causing the server to load a volume overwrite agent.

15. The media of claim 14, wherein execution of the sequences of instructions further causes the data center to perform the action of:
after causing the server to load the volume overwrite agent, but before providing the pseudo-random data stream to the server, verifying loading of the volume overwrite agent.

16. The media of claim 13, wherein the length of the pseudo-random data stream is determined based on knowledge of the server, which knowledge is acquired prior to when the server was provisioned to the first virtual network.

17. The media of claim 13, wherein the pseudo-random data stream is skew-corrected and non-compressible.

18. The media of claim 13, wherein execution of the sequences of instructions further causes the data center to:
if the server is determined to be in a compromised state, powering down the server and marking the server as compromised; and
if the server is determined to be in a non-compromised state, powering down the server and marking it as being available for further re-provisioning.

19. The media of claim 18, wherein execution of the sequences of instructions further causes the data center to:
if the server is determined to be in a non-responsive state, power down the server and mark the server as compromised.

* * * * *